Feb. 26, 1929.

T. H. PORTER 1,703,209

DOG RACING APPARATUS

Filed April 22, 1927

Inventor:
Thomas H. Porter,
By Cromwell, Greist & Warden
attys

Patented Feb. 26, 1929.

1,703,209

UNITED STATES PATENT OFFICE.

THOMAS H. PORTER, OF COLUMBUS, OHIO, ASSIGNOR, BY MESNE ASSIGNMENTS, TO HARRY B. STAVER, OF CHICAGO, ILLINOIS.

DOG-RACING APPARATUS.

Application filed April 22, 1927. Serial No. 185,887.

This invention has to do with dog racing apparatus, and is particularly concerned with the starting boxes from which the dogs are released at the commencement of a race.

The principal object of the invention is to provide improved means for quickly and positively opening the front door of the starting box.

Other objects and advantages of the invention will be evident to those skilled in the art upon a full understandinng of the construction, arrangement and operation of the improved door-opening means.

Two slightly different forms of the invention are presented herein for the purpose of exemplification, but it will of course be appreciated that the invention is susceptible of embodiment in still other forms coming equally within the comprehensive scope of the appended claims.

Figure 1:
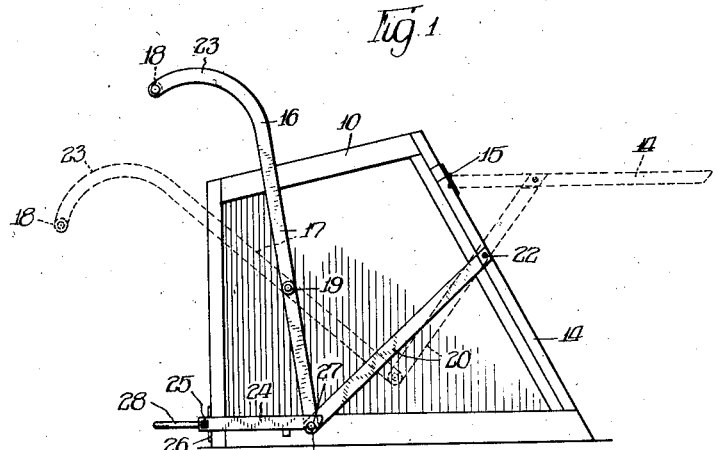
Fig. 1 is an end view of a starting box equipped with the improved door-opening means.
Figure 2:
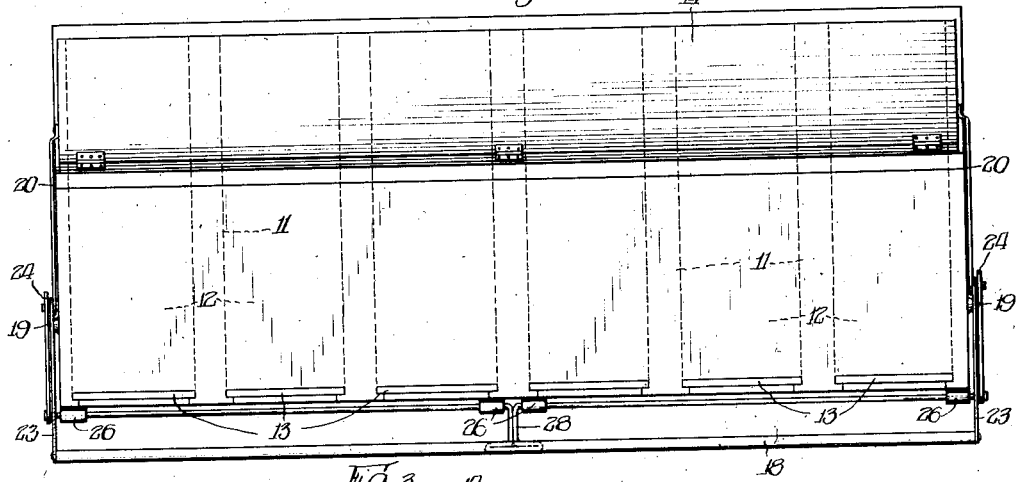
Fig. 2 is a plan view of the same.

As will be observed in the drawing, the starting box is an elongated box-like structure 10 which is divided by partitions 11 into a number of stalls 12. The rear ends of the stalls are closed by individual doors 13, while the front ends are closed by a single door 14 which is common to all of the stalls. The dogs are placed in the stalls through the rear doors 13, and, when the race starts, leave the stalls simultaneously through the front door 14.

The door 14 is hinged at 15 to the upper portion of the starting box, and is adapted to be swung from the closed position shown in full lines in Fig. 1 to the open position shown in dotted lines in that view. The door 14 is opened by means of a generally U-shaped handle 16, which includes two side levers 17 and a cross rod 18. The side levers 17 are pivoted at 19 to the ends of the starting box, and the lower free ends of the side levers opposite the ends secured to the cross rod 18 are connected to the door 14 by means of links 20, which links are pivoted at 21 to the side levers and at 22 to the ends of the door. When the cross rod 18 is grasped and that portion of the U-shaped handle swung downwardly, the links 20 force the door 14 to swing upwardly about the hinging axis 15. The upper portions of the side levers 17 are preferably offset rearwardly at 23, and such offsetting places the weight of the upper portion of the handle in a position to more or less counterbalance the weight of the links 20 and door 14 when the latter commences to open, thereby permitting the door to be opened quickly and positively with a minimum of effort.

The door 14 is normally held closed by means of two end latches 24, which latches are secured to and project forwardly from the ends of a rod 25 which is journaled in brackets 26 along the lower rear edge of the starting box. The front ends of the latches 24 are provided with notches 27 which, when the door 14 is closed, fit over and interlock with the pivot pins 21 which connect the lower ends of the side levers 17 with the links 20. The rod 25 is provided intermediate its ends, with a rearwardly extending portion 28 which forms a convenient foot lever for rocking the rod 25.

When it is about time to release the dogs, the operator stands in a position behind the starting box with his hands on the cross rod 18 and with one foot on the foot lever 28. At the instant when it is desired to open the door 14, the operator depresses the foot lever 28 and swings the cross rod 18 downwardly, whereupon the pivot pins 21 are released from the latches 24 and the door 14 is raised by the links 20.

Figure 3:
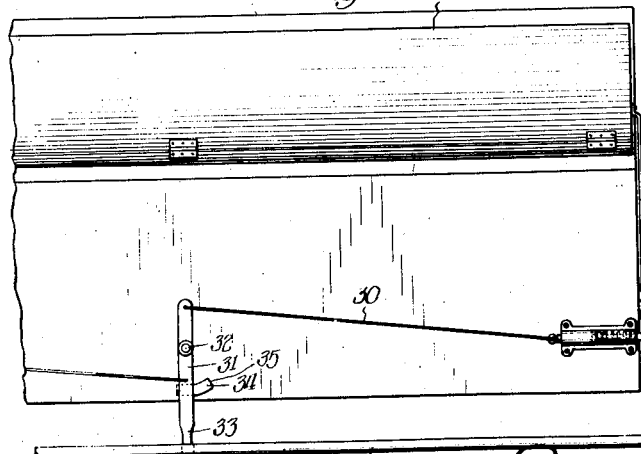
Fig. 3 is a fragmentary plan view of the same, showing a modified form of the latch; and Figure 4:
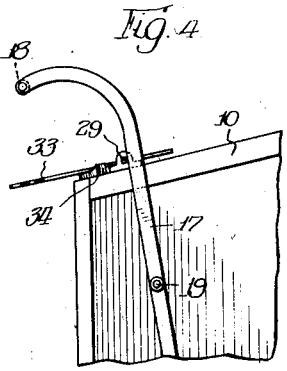
Fig. 4 is a fragmentary end view of the same, showing the form of latch illustrated in Fig. 3.

In Figs. 3 and 4 the latching mechanism above described is dispensed with, and the door 14 is instead prevented from opening prematurely by means of two spring-pressed latches 29 which are mounted on the top of the starting box at the ends of the same. The latches 29 normally project beyond the ends of the starting box into positions against the rear sides of the upper portions of the side levers 17, and prevent the upper portion of the handle 16 from being swung downwardly to open the door until such time as the latches 29 are retracted.

The latches 29 are connected by cables 30 to a pivoted hand lever 31, and the points of connection with the lever are at opposite sides of the pivotal axis 32 of the lever, whereby, when the rearwardly extending handle portion 33 of the lever is swung to the right as viewed in Fig. 3, both of the latches 29 will be retracted simultaneously from engagement with the side levers 17, and the upper portion of the handle 16 is free and may be swung downwardly to open the door. A plate 34 having an abutment 35 at one end of the same is preferably positioned beneath the lever 31, rearwardly of the pivotal axis 32, and in sliding engagement with the lever, whereby, when the handle portion 33 is swung to the right to release the latches 29, such portion will drop into interlocked engagement with the abutment 35 on the plate 34, thus preventing the latches 29 from returning into the path of the side levers 17 until the door 14 has been closed again and the side levers 17 returned to their normal upright positions in front of the latches.

I claim:

1. In a starting box, a plurality of stalls, a single front door for all of said stalls hinged to swing upwardly in opening, a generally U-shaped handle for opening the door, pivotal connections between the sides of the handle and the ends of the box, and links connecting the sides of the handle with the sides of the door for swinging the door open upon oscillation of the handle.

2. In a starting box, a plurality of stalls, a single front door for all of said stalls hinged to swing upwardly and outwardly in opening, a generally U-shaped handle extending behind the box from one end of the same to the other for opening the door, pivotal connections between the sides of the handle and the ends of the box, and other connections between the sides of the handle and the sides of the door for swinging the door open upon oscillation of the handle, said handle being movable from an inclined position wherein the door is closed into a more nearly horizontal position wherein the door is open.

3. In a starting box, a plurality of stalls, a single front door for all of said stalls hinged to swing upwardly and outwardly in opening, a generally U-shaped handle extending behind the box from one end of the same to the other for opening the door, pivotal connections between the sides of the handle and the ends of the box, and other connections between the sides of the handle and the sides of the door for swinging the door open upon oscillation of the handle.

4. In a starting box, a plurality of stalls, a single front door for all of said stalls hinged to swing upwardly and outwardly in opening, a generally U-shaped handle extending from one end of the box to the other for opening the door, pivotal connections between the sides of the handle and the ends of the box, and other connections between the sides of the handle and the sides of the door for swinging the door open upon oscillation of the handle, said handle being movable from a relatively high position wherein the door is closed into a relatively low position behind the box wherein the door is open.

In testimony whereof I have hereunto subscribed my name.

THOMAS H. PORTER.